United States Patent [19]

Zhang

[11] Patent Number: 5,065,394
[45] Date of Patent: Nov. 12, 1991

[54] PACKET ROUTING SWITCH

[75] Inventor: Ning Zhang, Dublin, Calif.

[73] Assignee: Pacific Bell, San Francisco, Calif.

[21] Appl. No.: 400,121

[22] Filed: Aug. 3, 1989

[51] Int. Cl.⁵ .......................................... H04Q 11/04
[52] U.S. Cl. ..................................... 370/60; 370/94.1
[58] Field of Search .............................. 370/60, 94.1, 6

[56] References Cited

U.S. PATENT DOCUMENTS

| | | | |
|---|---|---|---|
| 4,661,947 | 4/1987 | Lea et al. | 370/60 |
| 4,785,446 | 11/1988 | Dias et al. | 370/60 |
| 4,788,679 | 11/1988 | Kataoka et al. | 370/60 |
| 4,813,038 | 3/1989 | Lee | 370/60 |

Primary Examiner—Douglas W. Olms
Assistant Examiner—Dang T. Ton
Attorney, Agent, or Firm—McCubbrey, Bartles, Meyer & Ward

[57] ABSTRACT

An improved packet routing network is disclosed in which inbound packets do not have to arrive synchronously. The network includes collision avoidance circuitry and an m stage switching network where the number of input lines to the network is $2^m$. Each stage in the first $(m-1)$ stages further comprises one or more line reducing circuits. Each line reducing circuit transfers each data packet input on an input line thereof to one of a plurality of output lines thereof. The number of line reducing input lines is greater than the number of line reducing output lines. The transfer is accomplished in a manner guaranteeing that no two data packets are output on the same line reducing output line.

3 Claims, 5 Drawing Sheets

PACKET ROUTING SWITCH

The present invention relates to telecommunication and more particularly to cross-connect switches.

The development of optical fiber transmission systems makes possible the development of high speed digital networks having data rates in excess of 1000 million bits per second. Numerous telecommunication systems based on fiber optic transmission systems have been implemented or proposed. One of these proposed systems operates by sending messages, referred to as packets, between users, in which each message includes an address which is used to route the message through the various switches in the telephone system. This type of system is referred to as a packet switching network.

The switches which operate in such packet switching networks must operate at speeds which are commensurate with the data rates on the optical fibers. If this condition is not met, the improved data rates associated with optical fibers can not be realized.

The switches in question receive data from a set of input optical fibers and transmit that data on a set of output optical fibers. The number of fibers in each set may be in the hundreds. Consider a packet arriving on one of the input optical fibers. The packet includes an address which specifies the output optical fiber on which the packet is to be transmitted. The switch must read the address portion of the packet and then transfer that packet to the output optical fiber in question. This operation must be accomplished for eaoh packet arriving on eaoh optical fiber.

In addition, the switch must guarantee that two packets do not collide. If two packets arriving on different input optical fibers have the same address, the switch must guarantee that only one of the packets is transmitted. The other packet must be stored in some form of buffer for later transmission.

Satisfactory switch designs for accomplishing this switching at data speeds consistent with the data rates on optical fibers are not available. Conventional "space" cross-connect switches of the Clos type (Bell Systems Technical Journal, 32, pages 406-424, 1953) are too slow. Each time a packet arrives on an input fiber, a path through the switch must be constructed without altering the paths already being used for transmitting other packets. Typically, a packet has less than 100 bits; hence, packets arrive on each fiber at intervals of less than one microsecond. In a 1000×1000 switch (1000 input and output lines), 1000 such packets arrive each microsecond. Hence, less than one nanosecond is available for calculating each path. This could only be accomplished by the use of massive parallel computer designs. Conventional computing algorithms used in this type of cross-connect switching have not been implemented on such computers. Furthermore, it is not clear that such computers would provide a cost-effective solution to this problem.

A second proposed design for implementing this cross-connect switch function is referred to as a "Batcher Banyan" network. In principle, this design has sufficient parallel computing power. However, such networks require that the various packets on the input lines all arrive at the same time. In practice, this can only be accomplished by providing buffering at eaoh input and by reducing the data rates on the input lines. Even small switches (i.e., 32×32) have effective data rates which are less than 100 million bits per second.

Broadly, it is an object of the present invention to provide an improved packet switching cross-connect switch.

It is another object of the present invention to provide a packet switching cross-connect switch that does not require all of the input data packets to arrive synchronously.

It is yet another object of the present invention to provide a packet switching cross-connect switch which is capable of operating at a speed consistent with the data rates on optical fibers.

These and other objects of the present invention will become apparent to those skilled in the art from the following detailed description of the invention and the accompanying drawings.

SUMMARY OF THE INVENTION

The present invention comprises a packet routing network for outputting data packets input on a plurality of network input lines thereto to a plurality of network output lines. Each data packet includes an address comprising m bits which specify a network output line on which said data packet is to be outputted. The routing network includes m stages. Each said stage comprises a routing circuit, including a plurality of routing input lines and routing output lines. One pair of routing output lines corresponds to each routing input line. The routing circuit transfers data packets input on each of the routing input lines to one of the two corresponding routing output lines. The choice of line depends on a specified bit of the address included in the said data packet being transferred. In addition, eaoh said stage in the first (m−1) said stages further comprises one or more line reducing circuits. Each line reducing circuit transfers each data packet input on an input line thereof to one of a plurality of output lines thereof. The number of line reducing input lines is greater than the number of line reducing output lines. The transfer is accomplished in a manner guaranteeing that no two data packets are output on the same line reducing output line. There are two said line reducing circuits corresponding to each routing circuit in any stage having a said line reducing circuit. Each routing output line is connected to a line reducing input line in a such a manner that each member of a pair of routing output lines is connected to a different line reducing circuit. In addition, each routing circuit input line in the first stage is connected to a corresponding network input line. Each line reducing output line in the ith stage, for i from 1 to (m−1) is connected to a routing input line in the (i+1)st stage and each network output line is connected to two of the routing output lines in the mth stage.

DETAILED DESCRIPTION OF THE INVENTION

Figures 1A, 1B, 1C:
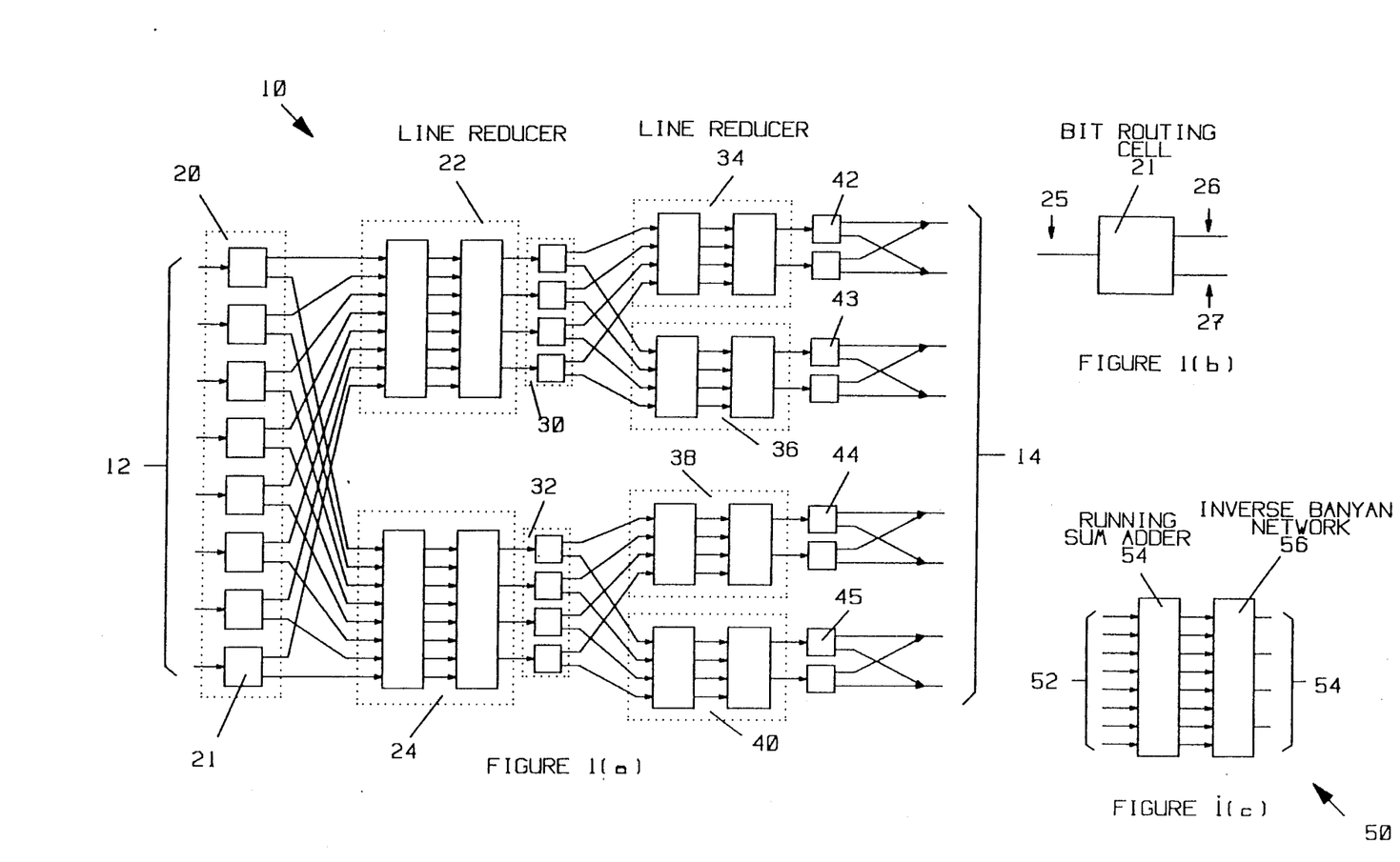
FIG. 1(a) is a block diagram of an exemplary routing circuit according to the present invention.
FIG. 1(b) is a more detailed block diagram of one of the bit routing cells employed in the routing circuit shown in FIG. 1(a).
FIG. 1(c) is a more detailed view of one of the line reducing circuits employed in the routing circuit shown in FIG. 1(c).

The present invention can be more easily understood in terms an exemplary routing circuit 10 shown in FIG. 1(a)-(c). Routing circuit 10 routes packets consisting of a plurality of header bits and a plurality of user data bits. The header bits include an address which specifies which of the output lines shown at 14 is to receive the packet in question. This address will be referred to as the outbound address in the following discussion. Since, routing circuit 10 takes packets from 8 input lines shown at 12 and delivers them to 8 output lines, the outbound address requires three bits.

To simplify the following discussion, it will be assured that no two inbound packets to routing circuit 10 have the same outbound address. The manner in which this condition is guaranteed will be discussed in more detail below.

Routing circuit 10 has the topology of a tree with the ensemble of input lines 12 at the root node thereof and the outbound lines at the leaf nodes. There is one node for eaoh bit in the outbound address. Each branch is affected by a bit routing circuit which is actuated by a predetermined bit of the outbound address. Bit routing circuit 20 is actuated by the first bit of the outbound address. Bit routing circuits 30 and 32 are actuated by the second bit of the outbound address, and bit routing circuits 42-45 are actuated by the third bit of the routing address. Here, the first bit of the outbound address is assumed to the most significant bit, and third bit is the least significant bit.

Each bit routing circuit includes a plurality of bit routing cells such as bit routing cell 21 shown in FIGS. 1(a)-(b). Bit routing cell 21 includes an input line 25 and two output lines 26 and 27. If the outbound address bit controlling bit routing cell 21 is a zero, then bit routing cell 21 routes the packet to line 26. If the outbound address bit controlling bit routing cell 21 is a one, then bit routing cell 21 routes the packet to line 27. For the purposes of this discussion, outputs analogous to output 26 will be referred to as the high outputs, and outputs analogous to output 27 will be referred to as the low outputs.

Since it is assumed that no two input packets have the same outbound address, half of the output lines, at most, from any bit routing circuit will be delivering packets to the circuitry connected thereto. To minimize the number of routing cells needed in routing circuit 10, a line reducing circuit is utilized to eliminate the lines not currently being used to transmit packets. The high outputs of eaoh bit routing circuit, with the exception of the bit routing circuits 5 at the leaf nodes (i.e., bit routing circuits 42-45), are connected to a line reducing circuit, and the low outputs are connected to a different line reducing circuit. For example, the high outputs of bit routing circuit 20 are connected to line reducing circuit 22 and the low outputs of bit routing circuit 20 are connected to line reducing circuit 24.

Each of the line reducing circuits has a set of input lines and a set of output lines. In the preferred embodiment of the present invention, the number of output lines is one half the number of input lines. However, embodiments having different ratios of input to output lines will be apparent to those skilled in the art. A line reducing circuit routes each packet on an input line thereto an output line thereof in such a manner that no more than one packet is output on any output line thereof at any given time.

The preferred embodiment of a line reducing circuit according to the present invention is shown at 50 in FIG. 1(c). Line reducing circuit 5u, operating on the output of a bit routing circuit actuated by the kth bit of the outbound address, has N input lines 52 and N/2 output lines 54. In the exemplary routing circuit shown at 10 in FIG. 1, N is $2^{4-k}$. As noted above, at any given time, at least half of the input lines to line reducing circuit 50 are not carrying packets. The purpose of line reducing circuit 50 is to eliminate input lines which are not carrying packets, thereby reducing the circuitry in the stages following the bit routing circuit in question.

This is accomplished by assigning a temporary address to each of the input lines and then utilizing an inverse Banyan network, described below, to reconnect the lines according to the temporary address in question. The temporary addresses are assigned in a predetermined order depending on the position of the input line and on whether or not a packet is being transmitted on the input line. The input lines are scanned in a predetermined order, for example, from top to bottom. A counter is used to keep track of the temporary addresses already assigned. The counter is set to zero at the beginning of the scan. If a given input line is not being used to transmit a packet, it is assigned a dummy address of zero. If the input line is being used to transmit a packet, the value in the counter is incremented by one and assigned to the input line in question. The temporary address is inserted in the header bits of the packet in a space reserved for this purpose.

In the preferred embodiment of the present invention, the counter in question is part of a running sum adder 54. Running sum adder 54 examines the data on each input line 52. If a packet is present, a one is added to the sum and the sum is inserted into the header field of the packet on the line. If no packet is present, a dummy address of zero is placed on the line. To provide sufficient time for incrementing the sum, each input to running sum adder 54 is buffered by a delay circuit which provides sufficient time for the above described addition to be performed.

Figure 2A:
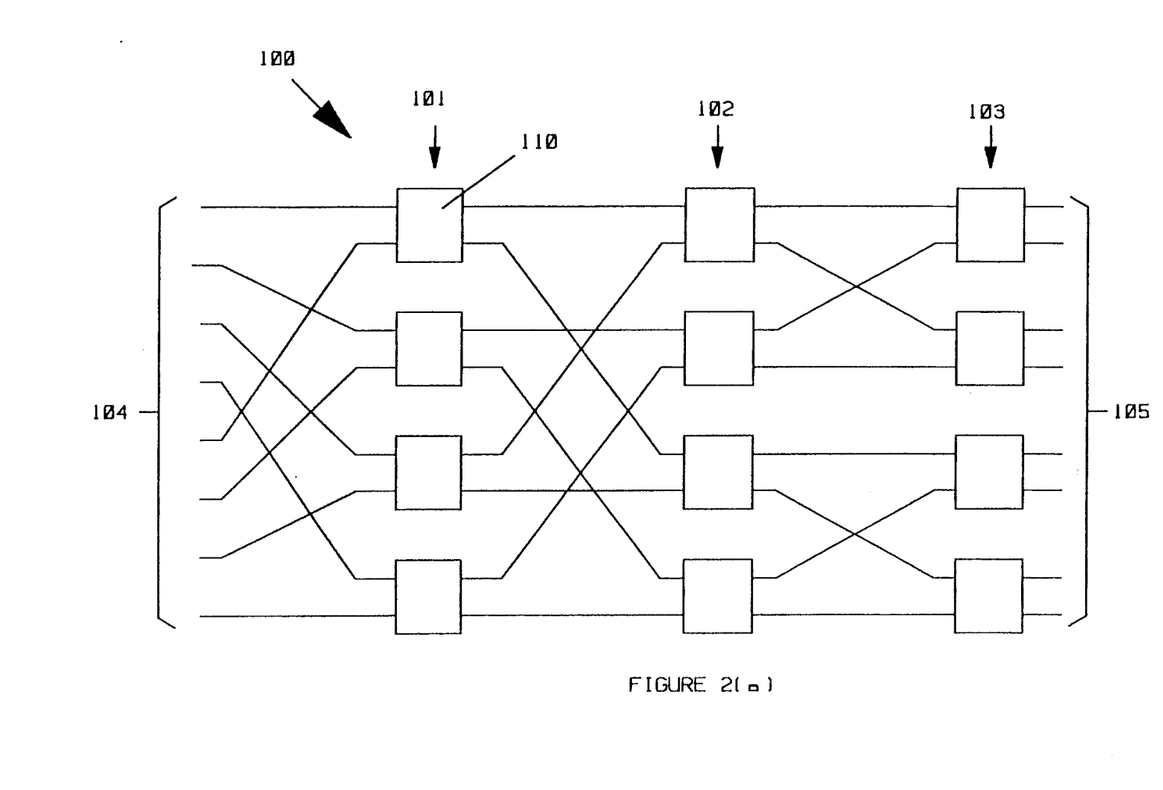
FIG. 2(a) is a block diagram of a Banyan network.

The actual identification and rerouting of the input lines that are not carrying packets is carried out by an inverse Banyan network. To simplify the discussion of an inverse Banyan network, the manner in which a conventional Banyan network operates will first be explained. An 8-input by 8-output (8×) Banyan network is shown in FIG. 2(a) at 100. Banyan network 100 routs packets present on input lines 104 to output lines 105 based on a three-bit address included in each 30 packet. Banyan network 100 has three stages 101-103. Each stage consists of four routing elements of which routing element 110 is typical.

Figure 2B:
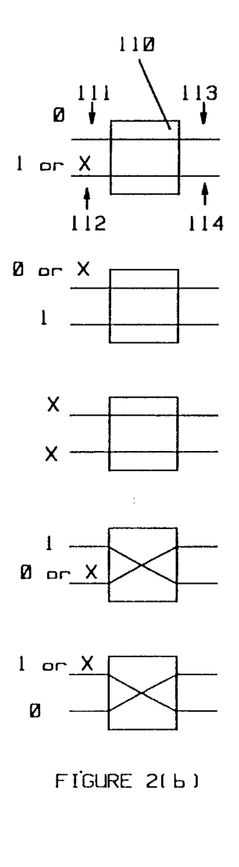
FIG. 2(b) illustrates the various connections made by a routing element of the type used to construct the Banyan network shown in FIG. 2(a).

As shown in FIG. 2(b), each routing element 110 has two input lines 111-112 and two output lines 113-114. The manner in which the input lines and output lines are connected to each other depends on one bit of the addresses contained in the packets present on the input lines. Different stages in the network operate on different address bits. Stage 101 is controlled by the most significant bit of the address. Stage 102 is controlled by the second bit of the address. And stage 103 is controlled by least significant bit of the address.

An input line can have three possible states, depending on the routing bit values on lines 111-112. The routing bit can be 0 or 1 or the line can be idle, denoted by an "X". The manner in which the lines are connected for each possible state are shown in FIG. 2(b) for all "legal" states of the two input lines.

If input lines 111-112 both have routing bit values which are 0 or 1, a conflict will occur. This "illegal" state is avoided in the present invention in a manner that will be discussed in more detail below. For the present discussion, it will be assumed that only legal states are present.

Figure 3:
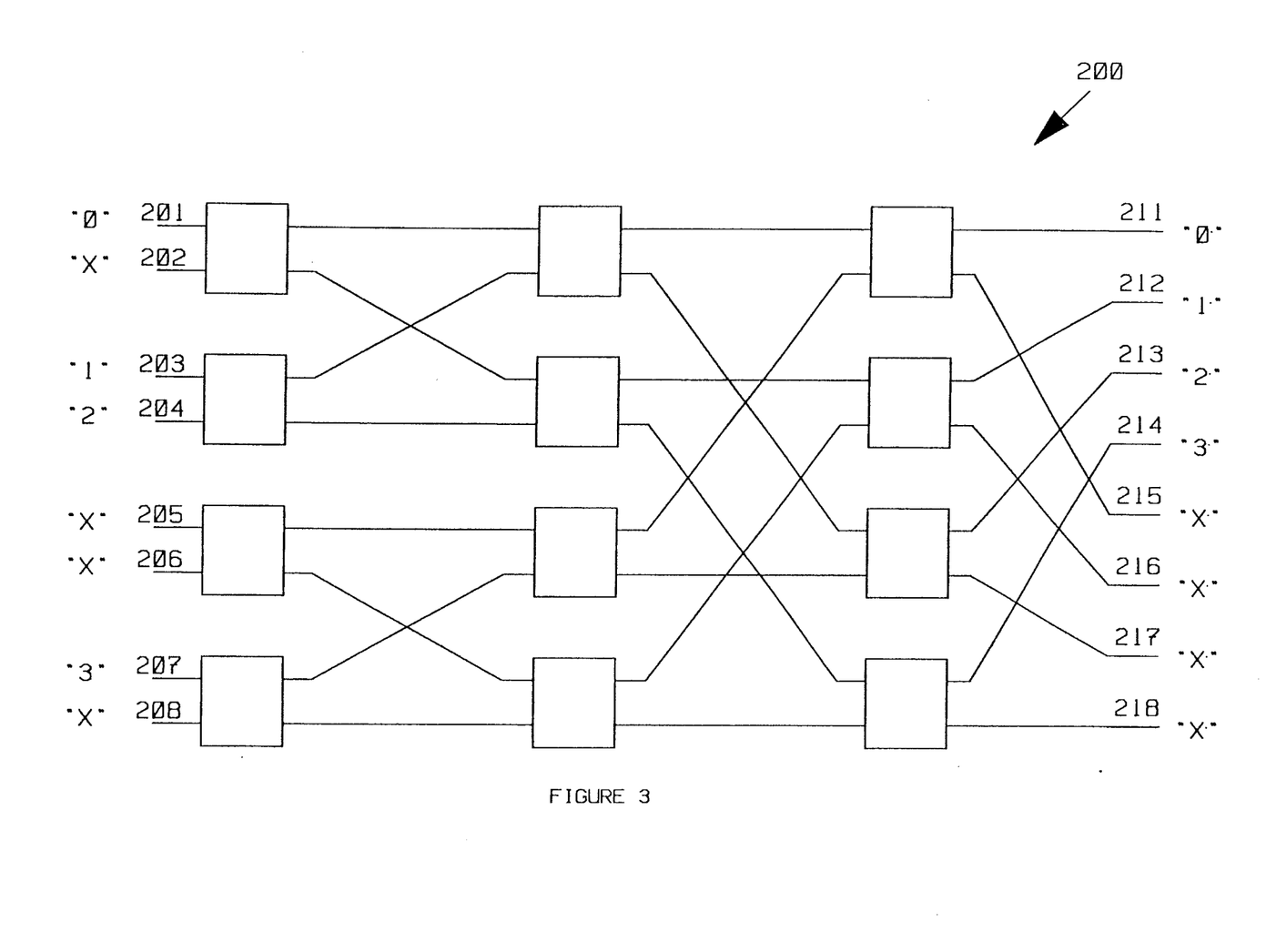
FIG. 3 is a block diagram of an inverse Banyan network.

As noted above, the present invention utilizes an inverse Banyan Network. In an inverse Banyan network, the input and output lines are reversed. An 8×8 inverse Banyan network is shown at 200 in FIG. 3. The input lines are labeled 201-208 and the output lines are labeled 211-218. Banyan network 200 routs the packets using the bits of the temporary address described above as the routing bits. With the exception of idle lines, the temporary addresses were assigned. Hence, the address present on lines 201-208 will be a monotonically increasing sequence with line number on those lines that have packets. A possible sequence of addresses is shown in FIG. 3 adjacent to lines 201-208. Here, an address of X denotes an idle line.

It may be shown that the inverse Banyan network has the property that the packets will be routed to lines 211-218 in a manner in which all of the packets will appear on adjacent lines ordered by the temporary address as shown by the addresses on lines 211-218. The inactive lines will be connected to the remaining output lines. Hence, provided the active input lines 201-208 have monotonically increasing addresses, the inverse Banyan network will group all of the active packets on adjacent lines. As noted above, the manner in which the present invention assigns temporary addresses assures that this condition is met.

As noted above, at most half of the input lines to the inverse Banyan network in each line reducing circuit 50 are active. Hence, the output lines of each line reducing circuit are connected to the appropriate half of the output lines of the inverse Banyan network.

Figure 4:
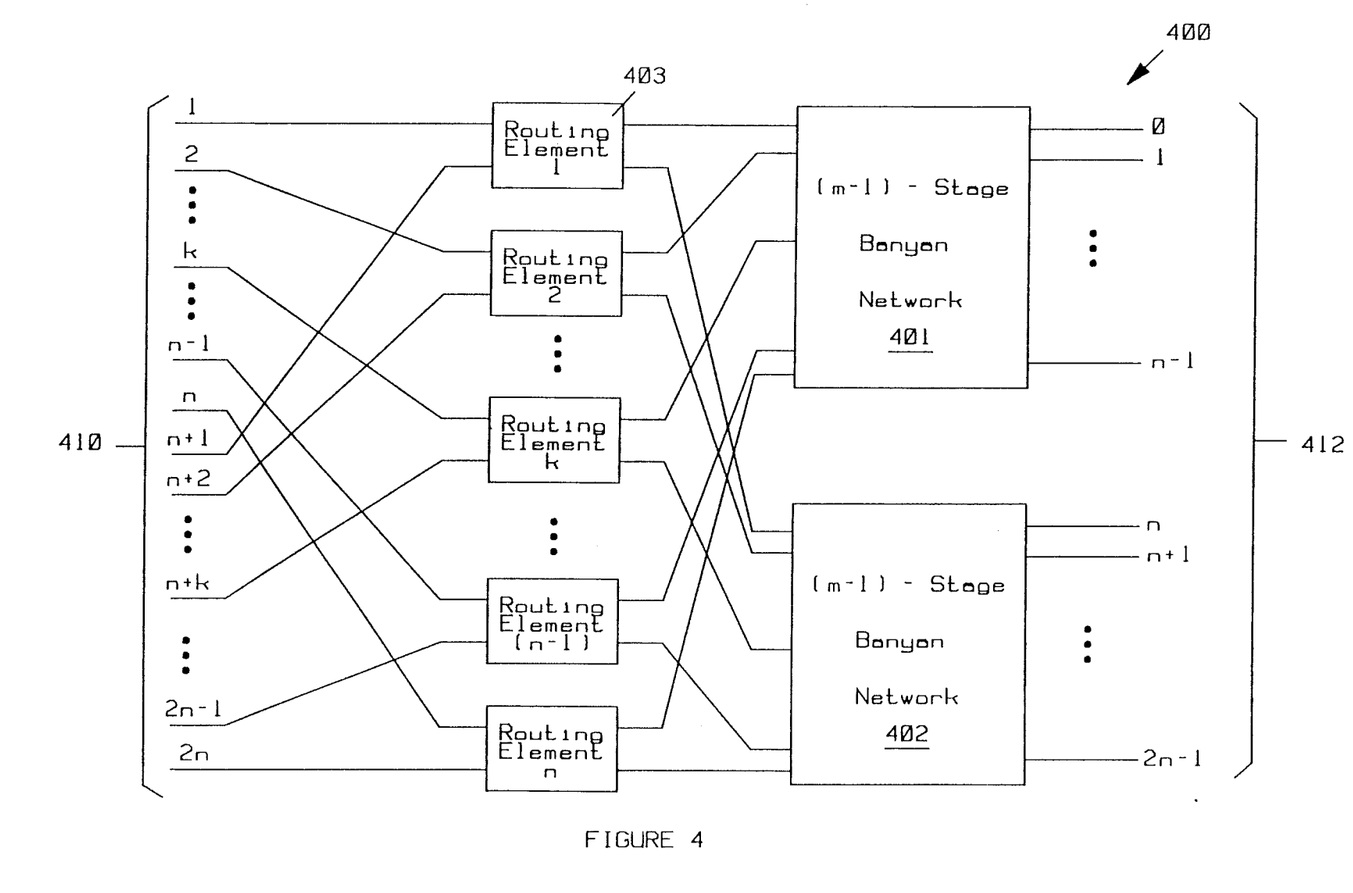
FIG. 4 illustrates the manner in which an m-stage Banyan network is constructed from two (m-1)stage Banyan networks.

The above examples utilized 8×8 Banyan networks. In general, a $2^m \times 2^m$ Banyan network consists of $2^{m-1}$ routing elements in which the ith stage routes packets according to the ith bit of the packet address. The manner in which the routing elements are connected is shown in FIG. 4 at 400. An m stage Banyan network having 2n output lines and 2n input lines may be viewed as consisting of an input stage having n routing elements 403 and two (m−1) stage Banyan sub-networks 401 and 402. Each sub-network has n input lines and n output lines. The output lines of sub-network 401 are labeled "0" through "n−1". The output network 402 are labeled n through "2n−1".

The kth routing element in the input stage is connected such that its first input line is the kth input line of the m stage network 400 which has input lines shown at 410. The second input line of the kth routing element is the (n+k)th input line of the m stage network 400. The first output line of the kth routing element is connected to the kth input line of the first sub-network 401. The second output line of the kth element is connected to the kth input line of the second sub-network 402.

A general $2^m \times 2^m$ inverse Banyan network consists of a $2^m \times 2^m$ Banyan network in which the input and output lines are reversed. That is, lines 412 in FIG. 4 would become the input lines and lines 410 would become the output lines.

The discussion of the routing circuit shown in FIG. 1(a)-(c) assumed that no two inbound packets had the same outbound address. If this occurs there will be a conflict in one of the inverse Banyan networks described above. To prevent such a conflict, the present invention preferably includes a priority arbitration circuit.

Figure 5:
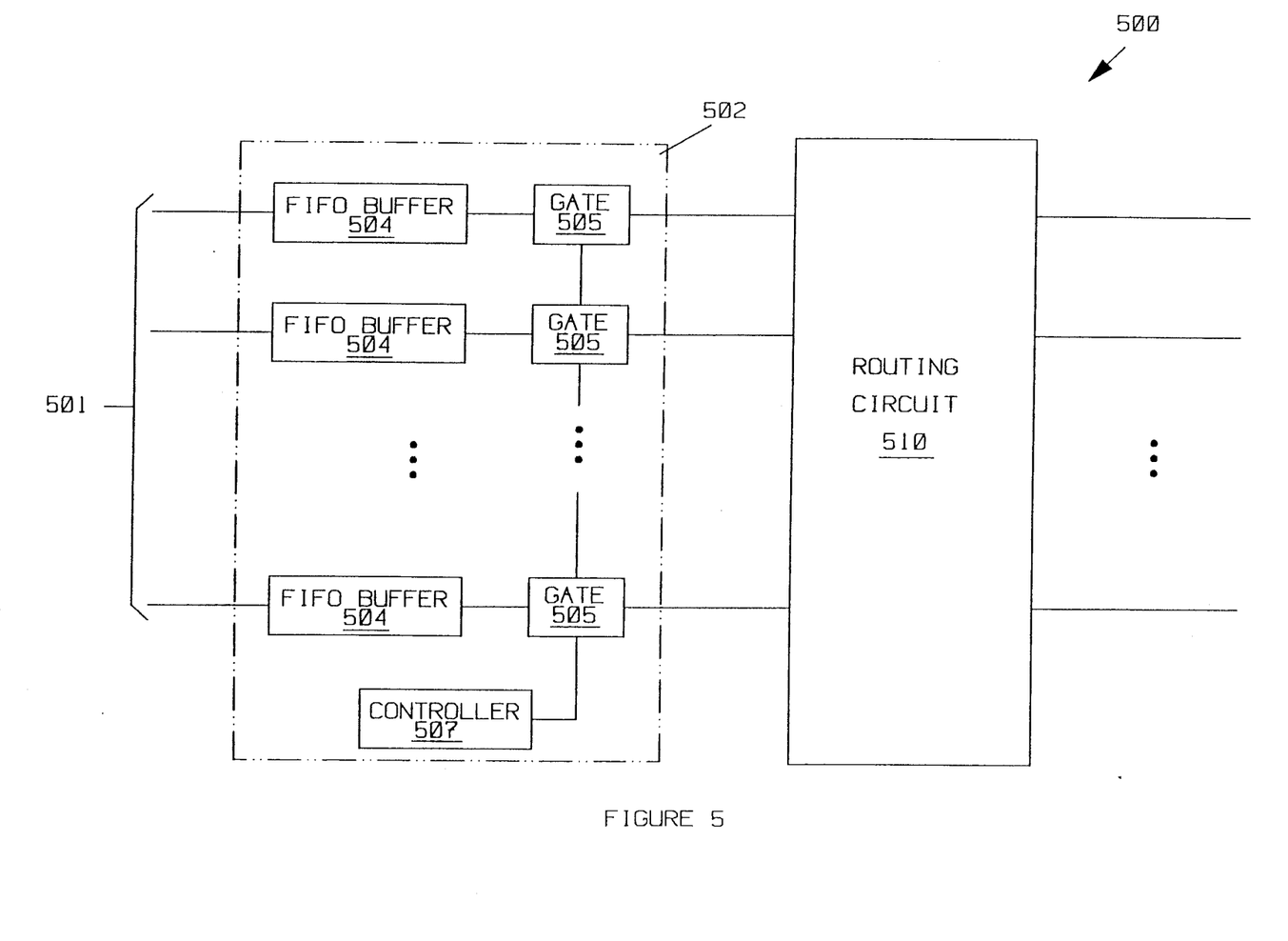
FIG. 5 is a block diagram of a routing network according to the present invention which includes circuitry for preventing more than one packet with a given outbound address from being sorted at any given time.

A block diagram of a routing circuit according to the present invention which includes a priority arbitration circuit is shown in FIG. 5 at 500. Each input line 501 is first routed through arbitration circuit 502. Arbitration circuit 502 is preferably a token ring arbitration circuit which includes a FIFO buffer 504 for each input line. There is one token in the ring for each possible outbound address. The input lines 501 are examined sequentially by controller 507. If the token for the outbound address specified in the packet on the line in question has not been assigned, a gate 505 is opened which allows the packet to enter routing circuit 510. Routing circuit 510 is similar to routing circuit 10 described above with reference to FIGS. 1(a)-(c). If the token in question is not available, the packet remains in the FIFO buffer associated with the input line 501 in question.

There has been described herein a novel packet routing switch. Various modifications to the present invention will become apparent to those skilled in the art from the foregoing description and accompanying drawings. Accordingly, the present invention is to be limited solely by the scope of the following claims.

What is claimed is:

1. A packet routing network for outputting data packets input on a plurality of network input lines thereto a plurality of network output lines, wherein each data packet includes an address comprising m bits which specify a network output line on which said data packet is to be outputted, said routing network comprising m stages, m being greater than 2, number from 1 to m. stage 1 being the first stage through which a data packet passes and stage m being the last stage through which a data packet passes, wherein each said stage comprises:

routing means including a plurality of routing input lines and routing output lines, a different pair of routing output lines corresponding to each input line, for transferring data packets input on each of said routing input lines to at most one of said two corresponding routing output lines depending upon a specified bit of said address included in the said data packet being transferred, and wherein each stage having a number between 1 and (m-1) inclusive further comprises line reducing means for transferring each data packet input on a line reducing input line to one of a plurality of line reducing output lines, the number of said line reducing input lines being greater than the number of said line reducing output lines, wherein no two data packets are output on the same line reducing output line, wherein there are two said line reducing means corresponding to each said routing means in said stages numbered 1 through (m-1), each routing output line being connected to line reducing input line, wherein each member o said pair of routing output lines is connected to a different said line reducing means, and wherein each routing means input line in the first said stage is connected to a corresponding network input line, wherein each said line reducing output line in the stage numbered i, for i from 1 to (m-1) is connected to a routing input line in the stage numbered i+1 and wherein each said network output line is connected to two said routing output lines in the stage numbered m.

2. The packet routing network of claim 1 wherein said line reducing means comprises means for assigning a temporary address comprising k bits to each packet input thereto, wherein k is greater than or equal to logarithm to the base two of the number of input lines thereto and a k-stage inverse Banyon network having the same number of input lines as said line reducing means, said line reducing output lines being connected to selected output lines of said inverse Banyon network, said inverse Banyan network performing sorting based on said temporary address bits.

3. The packet routing network of claim 1 further comprising arbitration means for assuring that no more than one packet with a given outbound address is input to the first stage of said routing network at any given time.

* * * * *

UNITED STATES PATENT AND TRADEMARK OFFICE
CERTIFICATE OF CORRECTION

PATENT NO. : 5,065,394                  Page 1 of 2

DATED : November 12, 1991

INVENTOR(S) : Zhang

It is certified that error appears in the above-identified patent and that said Letters Patent is hereby corrected as shown below:

Title page, "Attorney, Agent or Firm" delete "Bartles" should read --Bartels--.

Column 1, line 31, delete "eaoh" and insert therefor --each--.

Column 1, line 32, delete "eaoh" and insert therefor --each--.

Column 1, line 65, delete "eaoh" and insert therefor --each--.

Column 2, line 32, delete "eaoh" and insert therefor --each--.

Column 2, line 44, delete first occurrence of "a".

Column 2, line 62, delete "1(c)" and insert therefor --1(a)--.

Column 3, line 2, delete "(m-1)stage" and insert therefor --(m-1) stage--.

Column 3, line 30, delete "eaoh" and insert therefor --each--.

Column 3, line 59, delete "eaoh" and insert therefor --each--.

Column 3, line 60, delete "5".

Column 4, line 11, delete "5u" and insert therefor --50--.

Column 4, line 14, delete "54" and insert therefor --53--.

Column 4, line 55, delete "(8x)" and insert therefor --(8x8)--.

Column 4, line 58, delete "30".

Column 5, line 17, delete "Network" and insert therefor --network--.

Column 5, line 21, delete "routs" and insert therefor --routes--.

Column 5, line 24, delete "Were" and insert therefor --were--.

UNITED STATES PATENT AND TRADEMARK OFFICE
CERTIFICATE OF CORRECTION

PATENT NO. : 5,065,394

DATED : November 12, 1991

INVENTOR(S) : Zhang

It is certified that error appears in the above-identified patent and that said Letters Patent is hereby corrected as shown below:

Column 5, line 44, delete "eaoh" and insert therefor --each--.
Col. 5, line 56, delete "Eaoh" and insert --Each--.
Column 5, line 58, after "output" insert --lines of sub- --.
Column 6, line 26, delete "With" and insert therefor --with--.
Column 6, line 39, after "thereto" insert --to--.
Column 6, line 43, delete "number" and insert therefor --numbered--.
Column 6, line 68, after "to" insert --a--.
Column 7, line 1, delete "o" and insert therefor --of--.
Column 3, line 38, after "to" insert --be--.
Column 4, line 57, delete "routs" and insert therefor --routes--.
Column 5, line 3, after "by" insert --the--.

Signed and Sealed this

Twenty-fourth Day of August, 1993

*Attest:*

BRUCE LEHMAN

*Attesting Officer*   Commissioner of Patents and Trademarks